United States Patent [19]

Hert et al.

[11] Patent Number: 5,407,999
[45] Date of Patent: Apr. 18, 1995

[54] THERMOPLASTIC COMPOSITIONS BASED ON SATURATED POLYESTER AND MOLDED ARTICLES CONTAINING THEM

[75] Inventors: Marius Hert, Verneuil-En-Halatte; Germain Bertin, Lens, both of France

[73] Assignee: Norsolor, Paris, France

[21] Appl. No.: 46,332

[22] Filed: Apr. 14, 1993

Related U.S. Application Data

[63] Continuation of Ser. No. 566,352, Aug. 23, 1990, Pat. No. 5,208,292.

[30] Foreign Application Priority Data

Dec. 23, 1987 [FR] France ................. 87 17995

[51] Int. Cl.$^6$ ................................ C08L 67/02
[52] U.S. Cl. ................................ 525/166; 525/176
[58] Field of Search ..................... 525/166

[56] References Cited

U.S. PATENT DOCUMENTS 4,914,152  4/1990  Miyashita et al. ............... 525/68

FOREIGN PATENT DOCUMENTS 0206267 12/1986 European Pat. Off. .
0211649  2/1987 European Pat. Off. .
0285256 10/1988 European Pat. Off. .
2580656 10/1986 France .
WO/8503718  8/1985 WIPO .

OTHER PUBLICATIONS

Patent Abstracts of Japan, vol. 11, No. 60 (C-405)(2507), 24 Feb. 1987 (JP-A-61221260).

*Primary Examiner*—Patricia A. Short
*Attorney, Agent, or Firm*—Millen, White, Zelano, & Branigan

[57] ABSTRACT

Thermoplastic composition comprising at least 60% by weight of a saturated polyester and not more than 40% by weight of at least one polymeric reinforcement.

The polymeric reinforcement employed is an at least partially crosslinked polymeric composition obtained by mixing:

(a) at least one copolymer comprising from 94 to 60% by weight of ethylene, from 5 to 25% by weight of at least one alkyl or cycloalkyl acrylate or methacrylate in which the alkyl or cycloalkyl group has from 2 to 10 carbon atoms, and from 1 to 15% by weight of at least one unsaturated epoxide, (b) at least one copolymer comprising from 84 to 60% by weight of ethylene, from 15 to 34% of at least one alkyl or cycloalkyl acrylate or methacrylate in which the alkyl or cycloalkyl group has from 2 to 10 carbon atoms, and from 1 to 6% by weight of at least one anhydride of an unsaturated dicarboxylic acid, and (c) at least one compound capable of accelerating the reaction between the epoxy group present in the copolymer (a) and the anhydride group present in the copolymer (b).

10 Claims, No Drawings

THERMOPLASTIC COMPOSITIONS BASED ON SATURATED POLYESTER AND MOLDED ARTICLES CONTAINING THEM

This is a continuation of application Ser. No. 07/566,352, filed Aug. 23, 1990, now U.S. Pat. No. 5,208,292.

BACKGROUND OF THE INVENTION

The present invention relates to thermoplastic polyester alloys usable particularly for the production of moulded articles strengthened against impact.

The impact strengthening of thermoplastic polyesters such as, in particular, polyethylene terephthalate and polybutylene terephthalate constitute a continual preoccupation of the industry producing articles made of these materials. This preoccupation concerns not only strengthening against impact at ambient temperature but, increasingly, also strengthening against impact at very low temperatures. In fact, such moulded articles are likely to be employed not only for domestic purposes but also outdoors in cold countries, for example in the case of car components.

Thus U.S. Pat. No. 4,172,859 describes in particular a tough multiphase thermoplastic composition consisting essentially of a phase containing from 60 to 99% by weight of a saturated polyester matrix and from 1 to 40% by weight of another phase containing particles of a random copolymer from 0.01 to 3 microns in size, the said random copolymer being based on ethylene, on a first comonomer chosen from the anhydrides of unsaturated dicarboxylic acids and unsaturated epoxides and on a second comonomer chosen from acrylic and vinyl esters. Among the embodiments of this document which involve a random copolymer comprising an unsaturated epoxide, there may be noted a composition with a notched Izod impact strength of up to 86 kg cm/cm at 20° C. (value measured at the end of the specimen away from the injection side), this composition comprising 20% of a terpolymer containing 67% by weight of ethylene, 5% by weight of glycidyl methacrylate and 28% by weight of vinyl acetate. It should be noted, however, that the presence of vinyl acetate in this terpolymer constitutes a disadvantage when this composition is being converted; in fact, a release of acetic acid, reflecting a degradation of the terpolymer, is produced at the usual temperature of conversion into industrial articles.

Other documents show the possibility of improving the low-temperature impact strength of thermoplastic polyesters. Thus, patent EP-A-072,455 describes a composition comprising 100 parts by weight of polybutylene terephthalate, 10 parts by weight of a copolymer comprising 90% by weight of ethylene and 10% by weight of glycidyl methacrylate, and 20 parts by weight of a copolymer comprising 85 mol % of ethylene and 15 mol % of 1-butene. This composition has a notched Izod impact strength of 19 kg cm/cm at −40° C. Published Japanese Patent Application No. 86-204,258 describes a composition comprising 80 parts by weight of polybutylene terephthalate, 10 parts by weight of a copolymer consisting of 89% by weight of ethylene and 11% by weight of glycidyl methacrylate, 10 parts by weight of a copolymer consisting of 91 mol % of ethylene and 9 mol % of 1-butene, and of 1 part by weight of maleic anhydride. This composition has a notched Izod impact strength of 19 kg cm/cm at −30° C.

It should be noted that, while the low temperature performance levels achieved by the compositions of these last two documents already contribute a substantial improvement in the low-temperature performance of unmodified polybutylene terephthalate, they are still inadequate for many applications. In addition, these compositions exhibit ambient temperature performance which is clearly inferior to those described originally in the case of the U.S. Pat. No. 4,172,859. As a result, a first objective of the present invention consists in developing thermoplastic compositions based on saturated polyesters, having an excellent impact strength both at ambient temperature and at very low temperature. A second objective of the present invention, consists in developing thermoplastic compositions based on saturated polyesters not exhibiting the disadvantage of a decomposition of one of its constituents under the high temperature conditions to which the said compositions are subjected while being converted into industrial articles. A third objective of the present invention, consists in developing thermoplastic compositions based on saturated polyesters which, in addition to the above advantages, have a viscosity which is adapted to their conversion by injection moulding, and more particularly a melt index (determined at 250° C. under a load of 5 kg) of at least 10 dg/min.

SUMMARY OF THE INVENTION

A first subject matter of the present invention consists of a thermoplastic composition comprising at least approximately 60% by weight of a saturated polyester and not more than approximately 40% by weight of at least one polymeric reinforcement, characterized in that the polymeric reinforcement employed is an at least partially crosslinked polymeric composition obtained by mixing:
(a) at least one copolymer comprising approximately from 94 to 60% by weight of ethylene, approximately from 5 to 25% by weight of at least one alkyl or cycloalkyl acrylate or methacrylate in which the alkyl or cycloalkyl group has from 2 to 10 carbon atoms, and approximately from 1 to 15% by weight of at least one unsaturated epoxide,
(b) at least one copolymer comprising approximately from 84 to 60% by weight of ethylene, approximately from 15 to 34% of at least one alkyl or cycloalkyl acrylate or methacrylate in which the alkyl or cycloalkyl group has from 2 to 10 carbon atoms and approximately from 1 to 6% by weight of at least one anhydride of an unsaturated dicarboxylic acid, and
(c) at least one compound capable of accelerating the reaction between the epoxy group present in the copolymer (a) and the anhydride group present in the copolymer (b).

The combination of the components (a), (b) and (c), which is unique in relation to the teaching of the prior art recalled above, in the polymeric reinforcement enables the objectives of the present invention to be attained in an advantageous manner. Firstly, it is important that the copolymer (a) should contain at least approximately the specified proportions of ethylene, acrylate and unsaturated epoxide, these proportions being the only ones capable of providing the polymeric reinforcement, through this component, with the required adhesion to the saturated polyester matrix. Secondly, the same observation applies to the proportions of ethylene, acrylate and unsaturated anhydride in the copolymer (b). Thirdly, the compound (c) must be in a sufficient quantity, with regard to the copolymers (a) and (b), to fulfil efficiently its function as a promoter of at least partial crosslinking of the polymeric composition. The determination of the effective quantity of compound (c) is within the competence of the person skilled in the art, once the proportions of epoxide in the copolymer (a) and of anhydride in the copolymer (b) have been fixed. Finally, the simultaneous presence of the components (a) and (b) is indispensable to the effectiveness of the present invention, since the presence of the component (a) by itself has the disadvantages effect of imparting to the composition a melt index which is too low, that is to say a viscosity which is ill-suited to conversion by injection moulding.

Examples of alkyl acrylates and methacrylates which may be employed as constituents of the copolymers (a) and (b) are, in particular: methyl methacrylate, ethyl acrylate, n-butyl acrylate, isobutyl acrylate and 2-ethylhexyl acrylate. Examples of unsaturated epoxides which may be employed as constituents of polymer (a) are, in particular:

aliphatic glycidyl esters and ethers such as allyl glycidyl ether, vinyl glycidyl ether, glycidyl maleate and itaconate and glycidyl acrylate and methacrylate, and alicyclic glycidyl esters and ethers such as 2-cyclohexene-1-glycidyl ether, diglycidyl 4,5-cyclohexenedicarboxylate, glycidyl 4-cyclohexene carboxylate, glycidyl 5-norbornene-2-methyl-2-carboxylate and diglycidyl endocis-bicyclo(2.2.1)-5-heptene-2,3-dicarboxylate.

Examples of anhydrides of an unsaturated dicarboxylic acid which can be employed as constituents of the polymer (b) are particularly maleic anhydride, itaconic anhydride, citraconic anhydride and tetrahydrophthalic anhydride.

Among the compounds (c) capable of accelerating the reaction between the epoxy group present in the copolymer (a) and the anhydride group present in the copolymer (b) there may be mentioned in particular:

tertiary amines such as dimethyllaurylamine, dimethylstearylamine, N-butylmorpholine, N,N-dimethylcyclohexylamine, benzyldimethylamine, pyridine, 4-dimethylaminopyridine, 1-methylimidazole, tetramethylethylenediamine, tetramethylguanidine, triethylenediamine, tetramethylhydrazine, N,N-dimethylpiperazine and N,N,N',N'-tetramethyl-1,6-hexanediamine, tertiary phosphines such as triphenylphosphine.

The copolymer (a) forming part of the composition of the reinforcing polymer according to the invention may have a melt index (determined at 190° C. under 2.16 kg according to ASTM standard D 1238) chosen in a range from 1 to 50 dg/min, preferably 5 to 20 dg/min. The copolymer (b), forming part of the composition of the reinforcing polymer according to the invention may have a melt index (determined as above) chosen in a range from 1 to 50 dg/min.

The respective proportions of the copolymers (a)+(b) in the reinforcing polymer may be such that the weight ratio (a)/(b) is approximately between 0.1 and 10. These proportions may, in particular, be chosen by the person skilled in the art as a function of the respective contents of anhydride in the copolymer (b) and of unsaturated epoxide in the copolymer (a); these proportions are preferably chosen so that the relationship between the anhydride groups present in the copolymer (b) and the epoxide groups present in the copolymer (a) are approximately equimolar.

The saturated polyester forming part of the thermoplastic composition according to the invention may be chosen from linear saturated condensation products of glycols and of dicarboxylic acids, or of their reactive derivatives. These resins will preferably comprise products of condensation of aromatic dicarboxylic acids containing from 8 to 14 carbon atoms with at least one glycol of the formula $HO(CH_2)_nOH$ in which n is an integer from 2 to 10. The preferred polyesters are poly-1,4-butylene terephthalate and polyethylene terephthalate.

The compositions according to the invention may be modified by one or more conventional additives such as stabilisers and inhibitors of oxidative, thermal or ultraviolet degradation, lubricants and mould-release agents, colouring substances comprising colorants and pigments, fibrous and particulate fillers and reinforcements, nucleating agents, flame retardants, and the like.

The stabilisers may be incorporated in the composition at any stage of the preparation of the thermoplastic composition. The stabilisers are preferably included early enough to prevent an onset of degradation before the composition can be protected. These stabilisers must be compatible with the composition.

Viscosity-stabilising agents such as polycarbodiimides may be employed.

Agents for stabilising against oxidation and heat which can be used in the materials of the present invention include those generally employed in addition polymers. For example, they comprise sterically hindered phenols, hydroquinones, secondary amines and combinations thereof.

Agents for stabilising against the ultraviolet, for example in a proportion ranging up to 2% relative to the weight of the saturated polyester, may also be those generally employed in addition polymers. Examples which may be mentioned are various substituted resorcinols, salicylates, benzotriazoles, benzophenones and the like.

Lubricants and mould-release agents which may be employed, for example in proportions ranging up to 1% relative to the weight of the composition, are stearic acid, stearyl alcohol and stearamides; organic colorants such as nigrosine, and the like; pigments, for example titanium dioxide, cadmium sulphide, cadmium sulphoselenide, phthalocyanines, ultramarine blue, carbon black and the like; it is also possible to employ up to 50% relative to the weight of the composition of fibrous or particulate fillers and reinforcements, for example carbon fibres, glass fibres, amorphous silica, asbestos, calcium or aluminium silicate, magnesium carbonate, kaolin, chalk, powdered quartz, mica, feldspar, and the like; nucleating agents, for example talc, calcium fluoride, alumina and finely divided polytetrafluoroethylene, and the like; flame retardants comprising from 1 to 10% by weight of oxides of multivalent metals such as iron, tin, antimony, zinc, copper, magnesium and lead, in combination with from 3 to 20% by weight of halogenated aromatic and cycloaliphatic compounds such as hexabromobenzene, decabromobiphenyl oxide, hexabromodiphenyl carbonate, halogenated bisphenol A derivatives, such as tetrabromobisphenol A diacetate and the like.

The colouring substances (colorants and pigments) may be present in proportions of up to approximately 5% by weight relative to the weight of the composition.

The compositions according to the invention may be prepared by mixing the saturated polyester and the polymeric reinforcement, in the molten state, in a closed system, to form a uniform mixture in a multi-screw extruder such as a Werner-Pfleiderer extruder, generally incorporating from 2 to 5 kneading sections and at least one reverse pitch to produce an intensive shearing action, or other conventional plasticizing devices such as the Brabender, Banbury, Buss and other mixers.

Among the thermoplastic compositions according to the invention, more particular preference is given to those which have a notched Izod impact strength at least equal to 110 kg cm/cm at 20° C. and/or at least equal to 25 kg cm/cm at −30° C. and/or at least equal to 20 kg cm/cm at −40° C.

The present invention makes it possible to manufacture injection-moulded industrial articles which have an excellent impact strength both at moderate temperature and at very low temperature, such as, for example, shock absorbers and other components for the motor car industry.

The following examples are given merely by way of illustration of the present invention.

EXAMPLE 1

Comparative

The composition in question consists of 80 parts by weight of a poly-1,4-butylene terephthalate with a melt index (determined at 250° C. under 5 kg) of 79.3 dg/min, marketed under the name Ultradur ® B 4550, and of 20 parts by weight of a terpolymer with a melt index (determined at 190° C. under 2.16 kg) of 11 dg/min, consisting of 79% by weight of ethylene, 9% by weight of ethyl acrylate and 12% by weight of glycidyl methacrylate. This composition has been prepared in a Buss PR 46 co-kneader at a temperature of 240° C.

The resulting composition, which has a melt index (determined at 250° C. under 5 kg) of 1.7 dg/min, is illsuited to a conversion by injection moulding.

This composition has a notched Charpy impact strength, determined according to DIN standard 53453, as follows:

34 kJ/m² at 20° C.
19 kJ/m² at 0° C.
12 kJ/m² at −20° C.

EXAMPLE 2

A composition comprising the following is prepared under the conditions of Example 1:
80 parts by weight of the polyester Ultradur ® B 4550,
5 parts by weight of the terpolymer employed in Example 1,
15 parts by weight of a terpolymer with a melt index (determined at 190° C. under 2.16 kg) of 5 dg/min, marketed under the name Lotader ® 3700 and containing 68% by weight of ethylene, 30% by weight of ethyl acrylate and 2% by weight of maleic anhydride, and
1.2 parts by weight of dimethylstearylamine.

This composition has a melt index (determined at 250° C. under 5 kg) of 29.7 dg/min, which makes it wholly acceptable for conversion by injection moulding.

In addition, this composition exhibits:
a notched Charpy impact strength, determined according to DIN standard 53453, as follows:
45 kJ/m² at 20° C.
39 kJ/m² at 0° C.
15 kJ/m² at −20° C.

a notched Izod impact strength, determined according to ASTM standard D 256, as follows:
135 kg cm/cm at 20° C.
35 kg cm/cm at −30° C.
26 kg cm/cm at −40° C.

EXAMPLES 3 AND 4

Comparative

The compositions in question consist of 80 parts by weight of a polyethylene terephthalate (containing a minor proportion of poly-1,4-butylene terephthalate) marketed under the name Arnite ® AO 4900 and of 20 parts by weight of an ethylene terpolymer.

The terpolymer employed in Example 3 is that of Example 1.

The terpolymer employed in Example 4 is the Lotader ® 3700 described in Example 2.

These compositions, prepared in a Buss PR 46 cokneader at a temperature of 265° C., exhibit notched Charpy impact strengths (expressed in kJ/m² and determined according to DIN standard 53453) as shown in the Table below, as a function of the measurement temperature.

EXAMPLE 5

A composition consisting of the following is prepared under the conditions of Example 3:
80 parts by weight of the polyester Arnite ® AO 4900,
5 parts by weight of the terpolymer of Example 1,
15 parts by weight of terpolymer Lotader ® 3700, and
0.4 parts by weight of dimethylstearylamine.

This composition exhibits a notched Charpy impact strength, determined according to DIN standard 53453, as shown in the Table below as a function of the measurement temperature.

EXAMPLE 6

A composition consisting of the following is prepared under the conditions of Example 3:
75 parts by weight of the polyester Arnite ® AO 4900,
12.5 parts by weight of the terpolymer of Example 1,
12.5 parts by weight of the terpolymer Lotader ® 3700, and
0.3 parts by weight of dimethylstearylamine.

This composition exhibits a notched Charpy impact strength, determined according to DIN standard 53453, as indicated in the Table below as a function of the measurement temperature.

TABLE

| Example | 20° C. | 0° C. | −20° C. | −40° C. |
|---------|--------|-------|---------|---------|
| 3 | 30 | 13 | 8.0 | 5.7 |
| 4 | 6 | 4 | 3.7 | 3.6 |
| 5 | 46 | 23 | 9.2 | 7.6 |
| 6 | 40 | 33 | 11.8 | 8.4 |

We claim:
1. A thermoplastic composition consisting essentially of at least 60% by weight of a saturated polyester and not more than 40% by weight of at least one polymeric reinforcement, wherein said polymeric reinforcement is an at least partially crosslinked polymeric composition obtained by mixing:
(a) at least one copolymer comprising from 94 to 60% by weight of ethylene, from 5 to 25% by weight of at least one alkyl or cycloalkyl acrylate or methacrylate in which the alkyl or cycloalkyl group has from 2 to 10 carbon atoms, and from 1 to 15% by weight of at least one unsaturated epoxide, (b) at least one copolymer comprising from 84 to 60% by weight of ethylene, from 15 to 34% of at least one alkyl or cycloalkyl acrylate or methacrylate in which the alkyl or cycloalkyl group has from 2 to 10 carbon atoms, and from 1 to 6% by weight of at least one anhydride of an unsaturated dicarboxylic acid, and (c) at least one compound capable of accelerating the reaction between the epoxy group present in the copolymer (a) and the anhydride group present in the copolymer (b);

said polymeric reinforcement being present in a sufficient quantity to impart to said thermoplastic composition a melt index (determined at 250° C. under a load of 5 kg) of at least 10 dg/min., and to impart to said composition upon being molded into articles, a notched Izod impact strength of at least one but not more than two of the following values: at least equal to 110 kg cm/cm at 20° C., at least equal to 25 kg cm/cm at −30° C., and at least equal to 20 kg cm/cm at −40° C.

2. A thermoplastic composition according to claim 1, wherein the saturated polyester is polyethylene terephthalate or poly-1,4-butylene terephthalate; the unsaturated epoxide forming part of the composition of the copolymer (a) is glycidyl methacrylate; the anhydride of an unsaturated dicarboxylic acid forming part of the composition of the copolymer (b) is maleic anhydride; and the compound (c) is a tertiary amine.

3. A thermoplastic composition according to claim 1, wherein the weight ratio of the saturated polyester to the polymeric reinforcement is about 75–80 to about 20–25, respectively.

4. A thermoplastic composition according to claim 1 having a notched Izod impact strength of at least equal to 110 kg cm/cm at 20° C.

5. A thermoplastic composition according to claim 1 having a notched Izod impact strength of at least equal to 25 kg cm/cm at −30° C.

6. A thermoplastic composition according to claim 1 having a notched Izod impact strength of at least equal to 20 kg cm/cm at −40° C.

7. A thermoplastic composition according to claim 1 having a notched Izod impact strength of at least equal to 110 kg cm/cm at 20° C. and at least equal to 25 kg cm/cm at −30° C.

8. A thermoplastic composition according to claim 1 having a notched Izod impact strength of at least equal to 110 kg cm/cm at 20° C. and at least equal to 20 kg cm/cm at −40° C.

9. A thermoplastic composition according to claim 1 having a notched Izod impact strength of at least equal to 25 kg cm/cm at −30° C. and at least equal to 20 kg cm/cm at −40° C.

10. A thermoplastic composition according to claim 1, wherein the ratio of the copolymer (a) to the copolymer (b) is between 0.1 and 10.

* * * * *